(12) United States Patent
Mitra

(10) Patent No.: US 7,937,531 B2
(45) Date of Patent: May 3, 2011

(54) REGULARLY OCCURRING WRITE BACK SCHEME FOR CACHE SOFT ERROR REDUCTION

(75) Inventor: Somnath Mitra, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 339 days.

(21) Appl. No.: 11/670,381

(22) Filed: Feb. 1, 2007

(65) Prior Publication Data

US 2008/0189489 A1    Aug. 7, 2008

(51) Int. Cl.
*G06F 12/00* (2006.01)
*G06F 12/16* (2006.01)
*G06F 13/00* (2006.01)

(52) U.S. Cl. .. 711/135; 711/136; 711/143; 711/E12.022

(58) Field of Classification Search .................. 711/136, 711/143
See application file for complete search history.

(56) References Cited

U.S. PATENT DOCUMENTS

| | | | | |
|---|---|---|---|---|
| 3,840,862 A * | 10/1974 | Ready | ............................ | 711/128 |
| 4,291,196 A * | 9/1981 | Spaniol et al. | ..................... | 178/3 |
| 4,426,682 A * | 1/1984 | Riffe et al. | ............................ | 711/135 |
| 4,802,085 A * | 1/1989 | Levy et al. | ......................... | 710/3 |
| 4,811,203 A * | 3/1989 | Hamstra | ....................... | 711/143 |
| 5,155,824 A * | 10/1992 | Edenfield et al. | ............. | 711/143 |
| 5,307,477 A * | 4/1994 | Taylor et al. | ....................... | 711/3 |
| 5,524,235 A * | 6/1996 | Larson et al. | ................. | 711/151 |
| 5,551,001 A * | 8/1996 | Cohen et al. | ................... | 711/122 |
| 5,636,354 A * | 6/1997 | Lear | .................................. | 711/3 |
| 5,734,861 A * | 3/1998 | Cohn et al. | .................... | 711/134 |
| 5,828,844 A | 10/1998 | Civanlar | | |
| 5,870,763 A * | 2/1999 | Lomet | ............................ | 707/202 |
| 5,933,195 A | 8/1999 | Florencio | | |
| 5,933,593 A * | 8/1999 | Arun et al. | ......................... | 714/6 |
| 6,003,116 A * | 12/1999 | Morita et al. | .................. | 711/141 |
| 6,119,205 A * | 9/2000 | Wicki et al. | .................... | 711/134 |
| 6,278,716 B1 | 8/2001 | Rubenstein | | |
| 6,289,054 B1 | 9/2001 | Rhee | | |
| 6,567,929 B1 | 5/2003 | Bhagavath et al. | | |
| 6,608,841 B1 | 8/2003 | Koodli | | |
| 6,766,418 B1 * | 7/2004 | Alexander et al. | ............ | 711/129 |
| 6,782,490 B2 | 8/2004 | Maxemchuk et al. | | |
| 6,792,047 B1 | 9/2004 | Bixby | | |

(Continued)

FOREIGN PATENT DOCUMENTS

EP          1271953          1/2003

(Continued)

OTHER PUBLICATIONS

Lee, Jung-Hoon, J. S. Lee, and S. D. Kim. "A selective temporal and aggressive spatial cache system based on time interval." 2000 International Conference on Computer Design (IEEE), Proceedings, Sep. 17-20, 2000.*

(Continued)

*Primary Examiner* — Reginald G Bragdon
*Assistant Examiner* — Daniel J Bernard
(74) *Attorney, Agent, or Firm* — Stolowitz Ford Cowger LLP

(57) ABSTRACT

In one embodiment, a processor regularly writes one or more cache entries back to memory to reduce the likelihood of cache soft errors. The regularly occurring write backs operate independently of Least Recently Used (LRU) status of the entries so that all entries are flushed.

21 Claims, 3 Drawing Sheets

U.S. PATENT DOCUMENTS

| | | |
|---|---|---|
| 6,804,244 B1 | 10/2004 | Anandakumar et al. |
| 6,865,157 B1 | 3/2005 | Scott et al. |
| 6,910,148 B1 | 6/2005 | Ho et al. |
| 7,114,002 B1 | 9/2006 | Okumura et al. |
| 7,164,680 B2 | 1/2007 | Loguinov |
| 7,180,896 B1 | 2/2007 | Okumura et al. |
| 7,224,702 B2 | 5/2007 | Lee |
| 7,234,079 B2 | 6/2007 | Cheng et al. |
| 7,257,664 B2 | 8/2007 | Zhang |
| 7,263,075 B2 | 8/2007 | Roh et al. |
| 7,296,205 B2 | 11/2007 | Curcio et al. |
| 7,324,527 B1 | 1/2008 | Fraas et al. |
| 7,373,413 B1 | 5/2008 | Bich |
| 7,392,424 B2 | 6/2008 | Ho et al. |
| 7,397,759 B2 | 7/2008 | Tan et al. |
| 7,532,621 B2 | 5/2009 | Birman et al. |
| 7,562,277 B2 | 7/2009 | Park et al. |
| 7,707,303 B2 | 4/2010 | Albers |
| 2002/0114332 A1 | 8/2002 | Apostolopoulos et al. |
| 2002/0126711 A1 | 9/2002 | Robinett et al. |
| 2003/0101408 A1 | 5/2003 | Martinian et al. |
| 2003/0158899 A1 | 8/2003 | Hughes |
| 2003/0236903 A1 | 12/2003 | Piotrowski |
| 2004/0071128 A1 | 4/2004 | Jang et al. |
| 2004/0078624 A1 | 4/2004 | Maxemchuk et al. |
| 2004/0100937 A1 | 5/2004 | Chen |
| 2004/0114576 A1 | 6/2004 | Itoh et al. |
| 2004/0143672 A1 | 7/2004 | Padmanabham et al. |
| 2004/0196849 A1 | 10/2004 | Aksu et al. |
| 2004/0244058 A1 | 12/2004 | Carlucci et al. |
| 2005/0058131 A1 | 3/2005 | Samuels et al. |
| 2005/0074007 A1 | 4/2005 | Samuels et al. |
| 2005/0078698 A1 | 4/2005 | Araya et al. |
| 2005/0099499 A1 | 5/2005 | Braunstein |
| 2005/0198367 A1 | 9/2005 | Ettikan |
| 2005/0207406 A1 | 9/2005 | Reme |
| 2005/0249231 A1 | 11/2005 | Khan |
| 2005/0265346 A1 | 12/2005 | Ho et al. |
| 2005/0289623 A1 | 12/2005 | Midani et al. |
| 2006/0075084 A1 | 4/2006 | Lyon |
| 2006/0075443 A1 | 4/2006 | Eckert |
| 2006/0083263 A1 | 4/2006 | Jagadeesan et al. |
| 2006/0085551 A1 | 4/2006 | Xie et al. |
| 2006/0120378 A1 | 6/2006 | Usuki et al. |
| 2006/0126667 A1 | 6/2006 | Smith et al. |
| 2006/0143669 A1 | 6/2006 | Cohen |
| 2006/0159093 A1 | 7/2006 | Joo et al. |
| 2006/0187914 A1 | 8/2006 | Gumaste et al. |
| 2006/0188025 A1 | 8/2006 | Hannuksela |
| 2006/0242240 A1 | 10/2006 | Parker et al. |
| 2006/0242669 A1 | 10/2006 | Wogsberg |
| 2006/0279437 A1 | 12/2006 | Luby |
| 2007/0008934 A1 | 1/2007 | Balasubramanian et al. |
| 2007/0044130 A1 | 2/2007 | Skoog |
| 2007/0204320 A1 | 8/2007 | Wu et al. |
| 2007/0214490 A1 | 9/2007 | Cheng et al. |
| 2007/0268899 A1 | 11/2007 | Cankaya |
| 2007/0277219 A1 | 11/2007 | Toebes et al. |
| 2008/0062990 A1 | 3/2008 | Oran |
| 2008/0192839 A1 | 8/2008 | Gahm et al. |
| 2008/0225850 A1 | 9/2008 | Oran |
| 2008/0253369 A1 | 10/2008 | Oran |
| 2008/0256409 A1 | 10/2008 | Oran et al. |
| 2008/0267078 A1 | 10/2008 | Farinacci |
| 2008/0310435 A1 | 12/2008 | Cagenius et al. |
| 2009/0034627 A1 | 2/2009 | Rodriguez |
| 2009/0034633 A1 | 2/2009 | Rodirguez |
| 2009/0049361 A1 | 2/2009 | Koren et al. |
| 2009/0055540 A1 | 2/2009 | Foti et al. |
| 2009/0119722 A1 | 5/2009 | VerSteeg |
| 2009/0150715 A1 | 6/2009 | Pickens |
| 2009/0201803 A1 | 8/2009 | Filsfils |
| 2009/0201805 A1 | 8/2009 | Begen |
| 2009/0213726 A1 | 8/2009 | Asati |
| 2010/0005360 A1 | 1/2010 | Begen |
| 2010/0036962 A1 | 2/2010 | Gahm |

FOREIGN PATENT DOCUMENTS

| | | |
|---|---|---|
| EP | 1581005 | 9/2005 |
| EP | 1608116 | 12/2005 |
| EP | 1670252 | 6/2006 |
| EP | 2008728919 | 2/2008 |
| EP | 7814245.2 | 5/2009 |
| EP | 2007814246 | 6/2009 |
| EP | 8731381.3 | 11/2009 |
| WO | 9718637 | 5/1997 |
| WO | 0035201 | 6/2000 |
| WO | 00/76113 | 12/2000 |
| WO | 0161909 | 8/2001 |
| WO | 2006031925 | 3/2006 |
| WO | 2006057606 | 6/2006 |
| WO | 2006107424 | 10/2006 |
| WO | 2008/000289 | 1/2008 |
| WO | 2008033644 | 3/2008 |
| WO | 2008033645 | 3/2008 |
| WO | 2008100725 | 8/2008 |
| WO | 2008112465 | 9/2008 |
| WO | 2009099847 | 8/2009 |

OTHER PUBLICATIONS

Rajamoni, Ramakrishnan, R. Bhagavathula, and R. Pendse. "Timing analysis of block replacement algorithms on disk caches." 43rd IEEE Midwest Symposium on Circuits and Systems, Proceedings, Aug. 8-11, 2000.*

Degalahal, et al., Analyzing Soft Errors in Leakage Optimized SRAM Design, Article, Jan. 2003, pp. 1-7, 16th International Conference on VLSI Design.

Zhang, Computing Cache Vulnerability to Transient Errors and Its Implication, Article, Oct. 2005, pp. 1-9, IEEE Computer Society.

Weaver, et al., Reducing The Soft-Error Rate Of A High-Performance Microprocessor, Article, 2004, pp. 30-37, IEEE Computer Society.

Li, et al., Soft Error and Energy Consumption Interactions: A Data Cache Perspective, Article, Aug. 9, 2004, pp. 1-6, ISLPED '04.

Supplementary European Search Report for EP08731381, Mar. 26, 2010, 7 pages.

Rey et al., "RTP Retransmission Payload Format—RFC 4588", Jul. 1, 2006, 29 pages.

Handley, M. et al., "SIP: Session Initiation Protocol", RFC 2543, Mar. 1999.

T. Friedman, "RTP Control Protocol Extended Reports (RTCP XR)", RFC 3611, Nov. 2003.

Ott, "Extended RTP Profile for RTCP-based Feedback (RTP/AVPF)" draft-ieft-av-rtcp-feedback-01-txt., Nov. 21, 2001.

Approach Inc., "Streaming Media Technical Analysis", Nov. 2000.

Turner, Jonathan S., "WDM Burst Switching" www.isoc.org/inet99/proceedings/4j/4j_3.htm, 1999.

GossamerThreads, "Channel Change Speed", www.gossamer-threads.com/lists/engine?do=post_view_flat;post=13776, Sep. 12, 2003.

Nguyen, Thinh et.al., Protocols for Distributed Video Streaming, IEEE ICIP 2002.

Byers, John W. et al., Accessing Multiple Mirror Sites in Parallel: Using Tornado Codes to Speed Up Downloads, IEEE 1999.

Cisco Systems, Cisco Visual Quality Experience: Product Overview, www.cisco.com/en/US/partner/prod/collateral/video/ps7191/ps7126/product_data_sheet0900aecd8057f446.html, 2009.

Cisco Systems, Converge IP and DWDM Layers in the Core Network, http://www.cisco.com/en/US/prod/collateral/routers/ps5763/prod_white_paper0900aecd80395e03.html, 2007.

Silver Peak Systems, Inc., "Data Center Class WAN Optimization: Latency & Loss Mitigation", www.silver-peak.com/Technology/latency_loss_mitigation.htm, 2010.

P. A. Chou and Z. Miao, "Rate-distortion optimized streaming of packetized media," Microsoft Research Technical Report MSR-TR-2001-35, Feb. 2001.

Nguyen, Thinh and Avideh, Protocols for Distributed Video Streaming, Image Processing, 2002 Proceedings. 2002 Int, Dec. 10, 2002, vol. 3, 185-188, ISBN: 0-7803-7622-6.

Pendleton, et al., Session Initiation Protocol Package for Voice Quality Reporting Event draft-ietf-sipping-rtcp-summary-01, Telchemy Incorporated, http://www.ietf.org/internet-drafts/draft-ieft-sippin-rtcp-summaryy-01.txt, pp. 1-24, Feb. 2006.

Schulzrinne, et al., RTP: A Transport Protocol for Real-Time Applications, Network Working Group, 2003, pp. 1-92.

International Search Report for PCT/US09/032305; Date of mailing Oct. 5, 2009.

Written Opinion of the International Searching Authority for PCT/US09/032305; Date of mailing Oct. 5, 2009.

International Search Report for PCT/US08/55837; Date of mailing Jul. 3, 2008.

Written Opinion of the International Searching Authority for PCT/US08/55837; Date of mailing Jul. 3, 2008.

USPTO, PCT International Search Report for PCT/US07/76264, Jul. 7, 2008, 3 pgs.

Rosenberg, J., et al., "Registration of parityfec MME types", RFC 3009, Nov. 2000, 11 pgs.

Luby, M., et al., "Forward Error Correction (FEC) Building Block", RFC 3452, Dec. 2002, 16 pages.

Luby, M., et al., "Compact Forward Error Correction (FEC) Schemes", RFC 3695, Feb. 2004, 14 pages.

Ott, J., et al., "Extended RTP Profile for RTCP-based Feedback (RTP/AVPF)",RFC 4585; draft-ietf-avt-rtcp-feedback-11, Aug. 10, 2004, 52 pages.

Watson, M., "Basic Forward Error Correction (FEC) Schemes", draft-ietf-rmt-bb-fec-basic-schemes-revised-02, Mar. 3, 2006, 17 pages.

Chesterfield, J., et al., "RTCP Extensions for Single-Source Multicast Sessions", draft-ietf-avt-rtcpssm-11, Mar. 6, 2006, 67 pages.

Rey, J., et al., "RTP Retransmission Payload Format", RFC 4588, Jul. 2006, 24 pages.

USPTO, PCT International Search Report for PCT/US08/52907, Jul. 7, 2008, 3 pgs.

Duffy, "Riverstone Recasts Multicast Video", 2 pages, Aug. 5, 2002, Network World Inc., www.networkworld.com/edge/news/2002/0805edge.html.

Lehman et al., Active Reliable Multicast (ARM), 1998, IEEE, pp. 581-589.

Liang et al., Feedback suppression in reliable multicast protocol, 2000, IEEE, pp. 1436-1439.

Adamson et al., Negative-Acknowledgment (NACK)-Oriented Reliable Multicast (NORM) Building Blocks (RFC 3941), Nov. 2004, RFC 3941 (IETF, ORG), pp. 1-37.

Written Opinion of the International Searching Authority for PCT/US08/52907; Mailing Date Jul. 7, 2008.

Written Opinion of the International Searching Authority for PCT/US07/76264; Mailing date Jul. 7, 2008.

International Search Report for PCT/US07/76265 ; Mailing date Aug. 20, 2008.

Written Opinion of the International Searching Authority for PCT-US07-76265; Aug. 20, 2008.

Zhang, Computing Cache Vulnerablity to Ransietn Errors And It's Implication, Article, Oct. 2005, pp. 1-9, IEEE Computer Society.

Weaver, et al. Reducing The Soft-Error Rate Of A High-Performance Microprocessor, Article, 2004, pp. 30-37, IEEE Computer Society.

Stolowitz Ford Cowger LLP, Listing of related cases Mar. 3, 2010.

European Search Report for EP08728919; Aug. 19, 2010; 11 pgs.

* cited by examiner

REGULARLY OCCURRING WRITE BACK SCHEME FOR CACHE SOFT ERROR REDUCTION

TECHNICAL FIELD

The present disclosure relates generally to the field of processors.

BACKGROUND

Alpha particles or neutron strikes can cause soft errors in a cache where a cell in the cache loses a stored charge causing a stored one to unintentionally flip to a stored zero. Since the chance of a soft error occurring in a cell increases with the amount of time the charge is stored, cache policies such as write-through mode have been used to minimize soft errors. In a write-through cache, every write to the cache also writes to main memory, which serves as a backup. However, write-through mode typically causes an unacceptable performance loss in applications such as network routers, database servers, and video game consoles.

Write-back mode is a better performing policy that does not immediately send data to memory after writing a cache entry. Instead, a tracking scheme is used to mark data stored in cache but not memory as "dirty." Data marked as dirty is then written-back to system memory before the cache cell having the data is written over. However, since data is stored in a cache without being backed up to main memory, currently write-back mode is much more vulnerable to soft errors.

Partial solutions have been developed to reduce the susceptibility of write-back mode, including radiation hardening, adding storage for tracking parity data, and using counters to track how long a cell stores dirty data. Generally, these partial solutions require adding hardware to the processor, which causes increases in manufacturing costs. The disclosure that follows solves this and other problems.

DESCRIPTION OF EXAMPLE EMBODIMENTS

Overview

Figure 1:
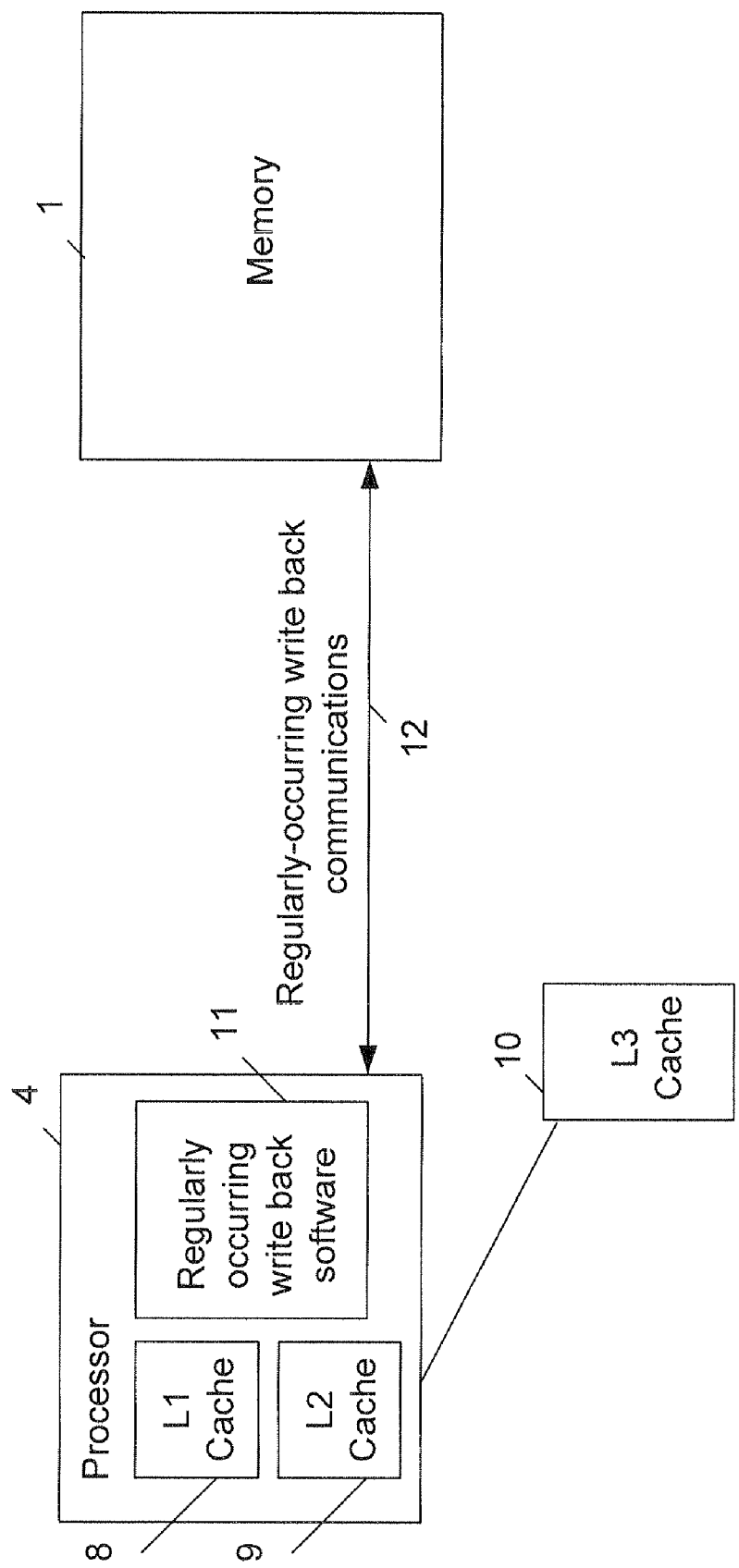
FIG. 1 illustrates an example processor having an improved write back policy that reduces vulnerability to soft errors.

In one embodiment, a processor regularly writes one or more cache entries back to memory to reduce the likelihood of cache soft errors. The regularly occurring write backs operate independently of Least Recently Used (LRU) status of the entries so that all entries are flushed.

Description

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device.

Only those parts of the various units are shown and described which are necessary to convey an understanding of the examples to those skilled in the art. Those parts and elements not shown are conventional and known in the art.

FIG. 1 illustrates an example processor having a write back policy that reduces vulnerability to soft errors.

Referring to FIG. 1, a processor 4 includes software 11 for performing regularly occurring write backs from cache to memory. The regularly occurring write back scheme leverages hardware that is, generally speaking, already included in processors to support conventional write back mode and other processor functionality.

The software 11 functions by regularly attempting to write back one or more cache lines stored on any cache, such as cache 8, 9 or 10, independently of how recently the cache lines have been used. Accordingly, the processor 4 sends regularly occurring write back communications 12 to the memory. In other words, the communications 12 occur regularly (and preferably at regular periodic intervals) such that the communications 12 do not necessarily correspond to the processor writing to any of the caches 8, 9 or 10.

In conventional write back schemes, cache entries are not written back to memory until the dirty cache line is updated with a new entry. These conventional write backs are dependent on how often the cache is updated with new entries, and therefore, have a direct correspondence to the processor writing to the cache. In other words, conventional write backs occur intermittently and are associated with the processor writing to cache.

In contrast to these conventional systems, the software 11 attempts to make write back communications 12 at regular intervals without regard to processor write activity and without regard to how long a cache entry has been dirty or even how long since the cache entry has been used. The software 11 systematically attempts to write back entries from one or more of the caches 8, 9 or 10, typically from the beginning of the cache to the end. When the end of the cache is reached, the systematic write back attempts begin again so that the regular write backs are constant and continuous.

The software 11 does not wait until a cache line has been unused for a certain amount of time, which requires adding a multitude of hardware counters and could cause a multitude of simultaneous communications likely to create a bottleneck between the processor 4 and the memory 1. The software 11 also does not consider whether the cache line has been recently used before performing a write back. Such a consideration could cause a dirty cache entry that is read over and over (without replacing) to remain dirty for a great period of time, and therefore highly susceptible to a soft error.

The software 11 may be used to write back entries regardless of whether they are located in a local cache such as cache 8 and 9 or a remote cache such as cache 10. The software 11 is usable regardless of whether integrated caches 8 and 9 are on-die or off-die.

Figure 2:
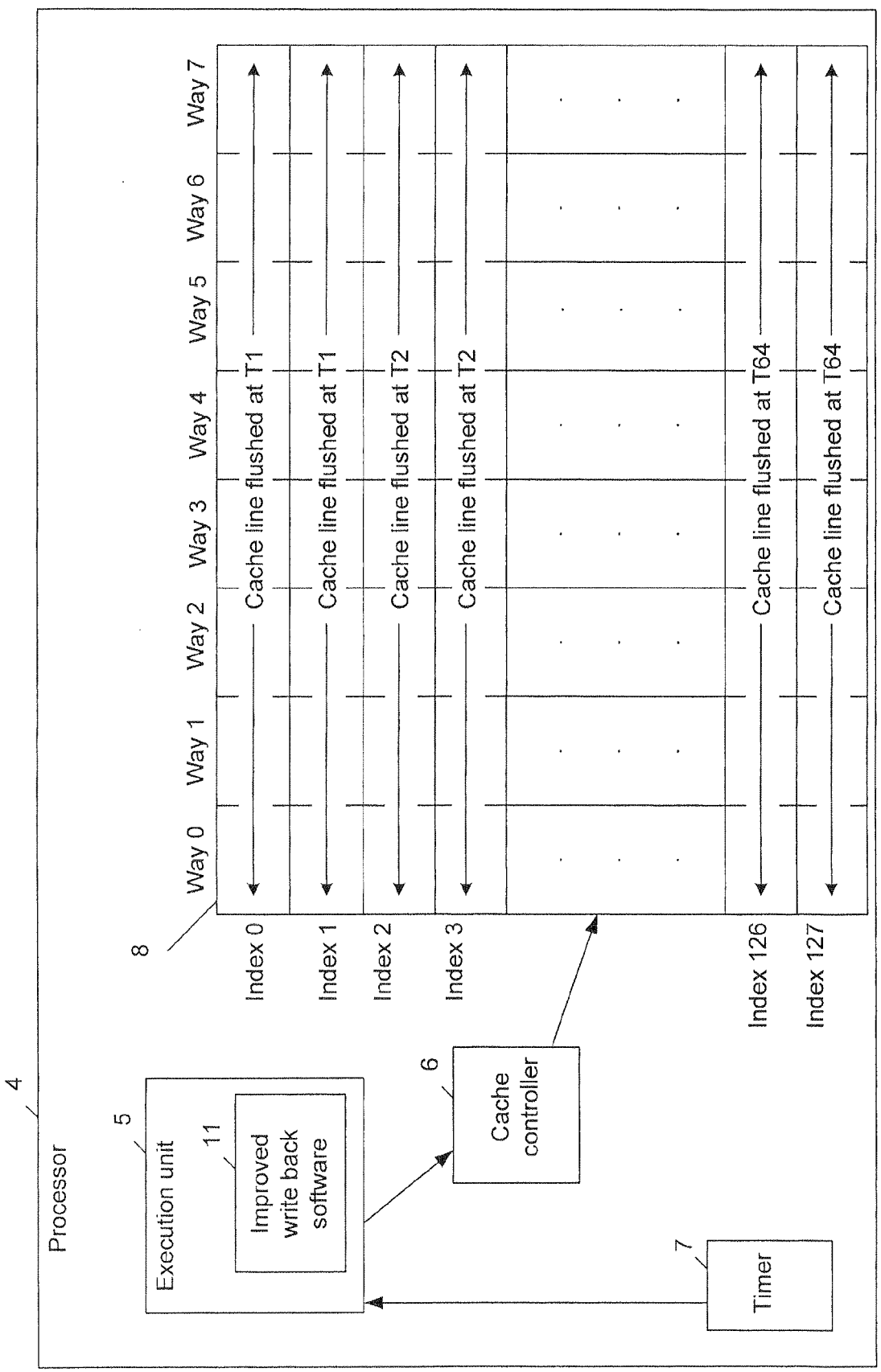
FIG. 2 illustrates an example of how the processor shown in FIG. 1 uses regularly occurring write backs to reduce vulnerability to soft errors.

FIG. 2 illustrates an example of how the processor shown in FIG. 1 uses regularly occurring write back communications to reduce vulnerability to soft errors.

The processor 4 may be a general purpose processor or an integrated processor that is specialized for a specific function. Although one processor 4 is shown, in other examples the software may be distributed amongst more than one processor. The processor 4 typically experiences a high amount of reads such that a write through policy causes an unacceptable performance loss, and therefore a write back policy is preferred. The processor 4 may include an execution unit 5 or any other means for executing the instructions in software 11.

In the present example, the cache 8 is a thirty two kilobyte cache having eight ways and one hundred and twenty-eight indexes or cache lines. Accordingly, the cache 8 includes one thousand and twenty-four cache entries of thirty-two bytes each. Any other cache size and organization may be used. Also, in the present example the illustrated layout corresponds to a physical layout of the cache such that a portion of the cache storing the entry at index zero and way zero is physically closer to the cache portion that stores the index one at way zero than the cache portion that stores the index zero at way one, which minimizes the chance of a single neutron strike affecting multiple ways of a cache for a single cache index.

The software 11 observes a regular interval by monitoring communications from a timer 7, which can be a crystal or any other means of producing a timing signal. Preferably, the timing signal is periodic having a period of 400 μs but any interval may be used. When the monitored interval is observed, an interrupt is sent to the processor 4 for identifying that a write back should occur. The processor 4 performs the write back in response to the interrupt using a cache flush instruction or other means to control the cache controller 6 that manages the cache 8.

For example, at a first time T1 the processor 4 flushes a portion of the cache, for example the cache lines at index zero and index one. At a second time T2, the processor 4 flushes another preferably equal amount of sequential cache lines, for example the cache lines at index two and index three. Preferably, the writing back of the cache lines to memory continues at regular intervals and sequentially through the indexes until the cache lines at indexes one hundred and twenty-six and one hundred and twenty-seven are flushed in response to the sixty-fourth occurrence of the time interval. The processor 4 continues to flush the cache 8 in a similar fashion indefinitely. Although stored data is flushing according to one or more cache lines in the present example, any smaller or larger portion of data in the cache may be flushed in other examples. Also, in other examples the processor 4 may omit performing one of these scheduled flushes when no included entries are marked as dirty, which indicates that all the included entries are already backed up to memory.

When the cache is flushing on a cache line basis, the order for flushing the cache is preferably determined according to proximity of corresponding physical portions of the cache. For example, a first portion of the cache storing index zero at way zero is physically closer that a second portion of the cache storing index one at way zero as compared to, for example, a third portion of the cache storing index one hundred and twenty six-at way zero. Therefore, after writing back index zero, the flushing preferably continues sequentially with index one rather than some other index. In other words, data is preferably flushed in an order that is based on physical proximity or physical organization of the cache and not according to how recently the data has been used.

Of course the above-described regularly occurring cache flushes do not replace the conventional "unscheduled" cache flushes that occur in write back memory. In other words, the processor 4 continues to write back dirty data just before writing over that dirty data.

The above-described regularly attempted cache flushes occur independently of whether data is denoted as Least Recently Used (LRU). Accordingly, the regularly occurring cache flushes ensure that all portions of the cache are less vulnerable to soft errors. Other systems that flush data based on an LRU state do nothing to address continuously read dirty data. For example, in these other systems dirty data that is read over and over is never flushed as the constant reading prevents the dirty data from being marked as LRU. Even more problematic, as the dirty data is read over and over, the dirty data is not replaced and therefore may not be written back to memory for a very long time, which greatly increase the susceptibility to soft error of such data. The present scheme for performing regularly occurring cache flushes reduces the susceptibility to soft error for such a portion.

The above-described write back scheme has limited performance impact while still reducing vulnerability to soft errors. For example, in a write-through system or other system that flushes the cache according to how often a portion of the cache is used, cache flushes occur in groups congregated around high processor activity. These groups of near simultaneous cache flushes can create bottlenecking memory accesses that cause a system stall. In contrast, in the present scheme the regularly occurring cache flushes are evenly distributed through periods of high and low processor activity. Similarly, the present scheme is better performing than systems that flush based on inactivity timers that can trigger a multitude of simultaneous cache flush instructions.

Figure 3:
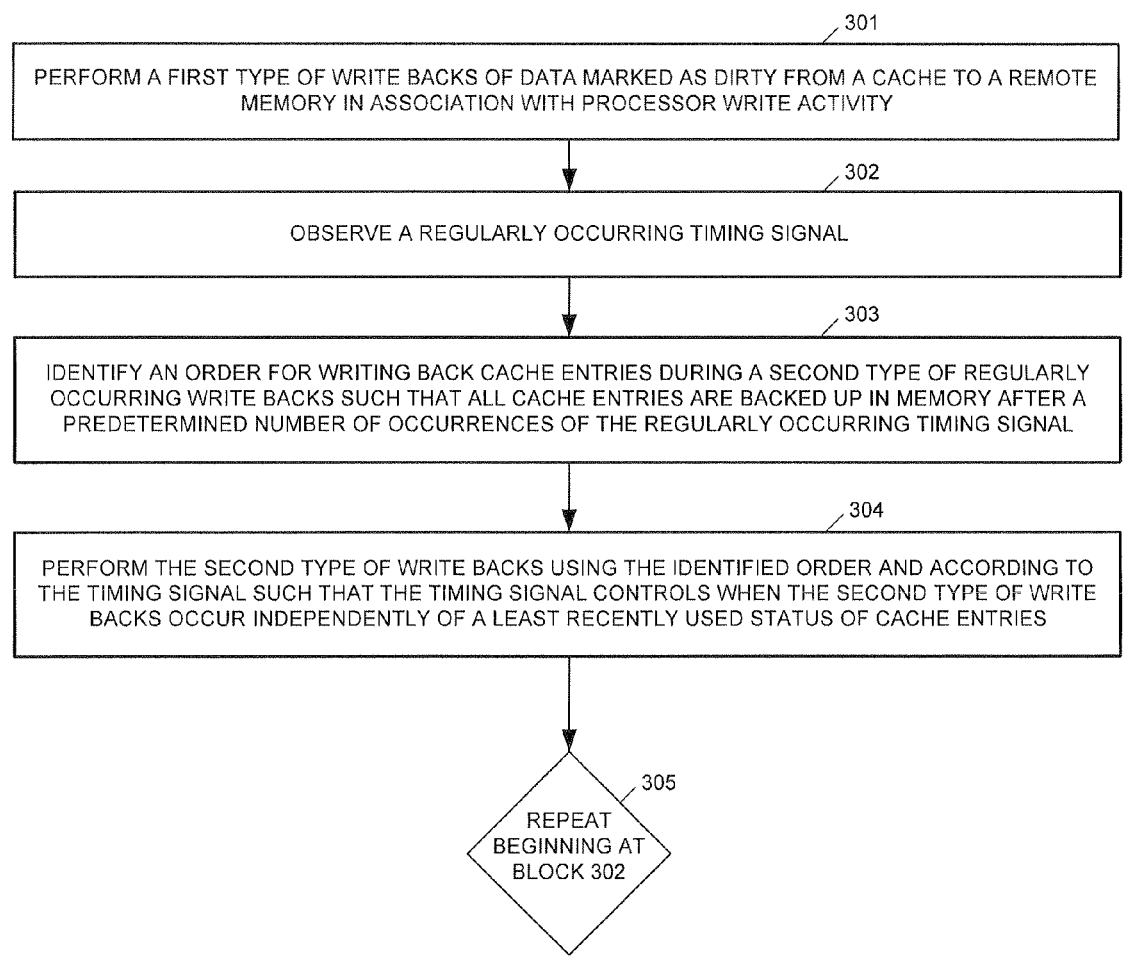
FIG. 3 illustrates an example method for using the processor illustrated in FIG. 1.

FIG. 3 illustrates an example method for using the processor illustrated in FIG. 1.

In block 301, the processor 4 performs a first type of write backs of data marked as dirty from a cache to a remote memory in association with processor write activity. The processor 4 also observes a regularly occurring timing signal, which is preferably periodic, in block 302. In block 303, the processor 4 identifies an order for writing back cache entries during a second type of regularly occurring write backs such that all cache entries are backed up in the memory after a predetermined number of occurrences of the regularly occurring time interval.

In block 304, the processor 4 performs the second type of write backs using the identified order and according to the timing signal such that the timing signal controls when the second type of write backs occur. These write backs are thus controlled by the timing signal independently of a Least Recently Used (LRU) status of cache entries. In other words, the second type of write backs is unassociated with the processor write activity that triggers the first type of write backs. In block 305, the processor 4 repeats the second type of write backs continuously using the same order to ensure that newly modified data is also backed up to memory without relying on the intermittent first type of write backs.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

I claim:

1. A method, comprising:
   selecting a cache entry of a cache memory to be written back to a remote memory;
   writing back the selected cache entry to the remote memory;
   identifying a time period T;
   selecting, from the cache memory, a next cache entry, said selecting of the next cache entry based on physical proximity of the next cache entry to the previously selected cache entry;
   after an amount of time equal to T passes, writing back the next cache entry to the remote memory; and
   according to the period of time T, repeating said selecting based on physical proximity, and repeating said writing back until all cache entries of the cache memory have been written back to the remote memory, wherein the amount of time between initiation of a particular write back and initiation of an immediately preceding write back thereof is identical to the amount of time between initiation of any other write back and initiation of an immediately preceding write back thereof.

2. The method of claim 1, wherein T is equal to 400 µs.

3. The method of claim 1, further comprising intermittently writing back data to the remote memory whenever a dirty cache entry is identified for rewriting.

4. A method, comprising:
   selecting a cache entry of a cache memory to be written back to a remote memory at a first occurrence of a regularly occurring time interval, said selecting occurring independently of how recently the selected cache entry has been used;
   writing back the cache entry to the remote memory at the first occurrence of the regularly occurring time interval; and
   repeating said selecting and writing back with a remaining cache entry of the cache memory at every subsequent occurrence of the regularly occurring time interval until all cache entries of the cache memory have been written back to the remote memory, wherein the amount of time between initiation of a particular write back and initiation of an immediately preceding write back thereof is identical to the amount of time between initiation of any other write back and initiation of an immediately preceding write back thereof;
   wherein the cache entry is selected independently of a Least Recently Used (LRU) status of the cache entry.

5. The method of claim 4, further comprising:
   selecting a next cache line to be written back to the remote memory at a second next occurrence of the regularly occurring time interval, the next cache line selected according to physical proximity of a cache memory region that corresponds to the next cache line and a different cache memory region that corresponds to the cache entry; and
   writing back the next cache line to the remote memory at the next regularly occurring time interval.

6. The method of claim 4, wherein said selecting occurs independently of how long the selected cache entries have been marked as dirty.

7. The method of claim 4, wherein the selected cache entries comprise all ways in a cache index.

8. The method of claim 4, wherein the cache memory is integrated with a processor controlling the selection, and the remote memory is non-integrated with the processor.

9. The method of claim 4, wherein all the cache entries are written back after sixty-four occurrences of the regularly occurring time interval.

10. The method of claim 4, further comprising:
    repeatedly re-flushing the cache memory by writing back all the cache entries to the remote memory in a same order as a previous periodic write back sequence.

11. An apparatus, comprising:
    a processor; and
    a memory coupled to the processor comprising instructions executable by the processor, the processor operable when executing the instructions to:
    perform unscheduled write backs of data stored in a cache in response to observing that the data is dirty and selected for write-over;
    receive a regularly occurring timing signal; and
    perform scheduled write backs of cache entries to memory whenever the timing signal is received regardless of how often the cache entries are accessed until data stored on the cache is fully backed up to a memory, wherein the amount of time between initiation of a particular scheduled write back and initiation of an immediately preceding scheduled write back thereof is identical to the amount of time between initiation of any other scheduled write back and initiation of an immediately preceding scheduled write back thereof.

12. The apparatus of claim 11, wherein the scheduled write backs back up a repetitively read cache entry that is not selected for write-over and not written back during the unscheduled write backs.

13. The apparatus of claim 11, wherein the scheduled write backs occur regardless of whether the cache entries are marked as dirty.

14. The apparatus of claim 11, wherein the processor is further operable to constantly repeat the scheduled write backs.

15. The apparatus of claim 14, wherein the cache entries are written back in a same order during the constantly repeated scheduled write backs.

16. The apparatus of claim 15, wherein the order is chosen according to a physical arrangement of cache lines that store the cache entries.

17. An apparatus, comprising:
- means for performing a first type of write backs from a cache to a memory, the first type of write backs initiated in association with a processor writing to the cache;
- means for generating a triggering signal, the generation of the triggering signal being unassociated with the processor writing to either the cache or the memory during the first type of write backs; and
- means for performing a second type of write backs from the cache to the memory, the second type of write backs initiated in response to the triggering signal, wherein the amount of time between initiation of a particular second type write back and initiation of an immediately preceding second type write back thereof is identical to the amount of time between initiation of any other second type write back and initiation of an immediately preceding second type write back thereof;
- wherein the triggering signal is periodic.

18. The apparatus of claim 17, wherein the second type of write backs are configured to write back all cache lines in the cache to the memory in a predetermined amount of time independently of how frequently the processor writes new data to the cache.

19. The apparatus of claim 17, wherein the write backs of the second type of write backs repeat constantly using a same order of cache lines.

20. A method, comprising:
- selecting a cache entry of a microprocessor cache memory to be written back to a remote volatile main memory;
- writing back the selected cache entry to the remote volatile main memory;
- identifying a time period T;
- selecting, from the microprocessor cache memory, a next cache entry, said selecting of the next cache entry based on physical proximity of the next cache entry to the previously selected cache entry;
- after an amount of time equal to T passes, writing back the next cache entry to the remote volatile main memory; and
- according to the period of time T, repeating said selecting based on physical proximity and the writing back until all cache entries of the microprocessor cache memory have been written back to the remote volatile main memory, wherein the amount of time between initiation of a particular write back and initiation of an immediately preceding write back thereof is identical to the amount of time between initiation of any other write back and initiation of an immediately preceding write back thereof;
- wherein the microprocessor cache memory periodically writes back to the remote volatile main memory independently of how recently the cache entries have been accessed.

21. The method of claim 20, wherein said periodic write backs from the microprocessor cache memory to the remote volatile main memory are completed independently of how recently the cache entries have been accessed to reduce susceptibility of the microprocessor cache memory to soft errors.

* * * * *